(12) United States Patent
Nakanishi et al.

(10) Patent No.: US 11,339,892 B2
(45) Date of Patent: May 24, 2022

(54) ELECTROMAGNETIC VALVE (71) Applicant: NIDEC TOSOK CORPORATION, Kanagawa (JP)

(72) Inventors: Tomohiko Nakanishi, Kanagawa (JP); Dongming Chen, Kanagawa (JP); Satoshi Yabushita, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 17/017,710

(22) Filed: Sep. 11, 2020

(65) Prior Publication Data
US 2021/0095780 A1  Apr. 1, 2021

(30) Foreign Application Priority Data

Sep. 26, 2019 (JP) .............................. JP2019-175745

(51) Int. Cl.
*F16K 31/06* (2006.01)
*F16K 27/04* (2006.01)

(52) U.S. Cl.
CPC ........ *F16K 31/0613* (2013.01); *F16K 27/048* (2013.01); *F16K 31/0675* (2013.01)

(58) Field of Classification Search
CPC ............... F16K 27/048; F16K 31/0613; F16K 31/0655; F16K 31/0675; F01M 13/0011; F01M 2013/0022; F01M 25/06
See application file for complete search history.

(56) References Cited

U.S. PATENT DOCUMENTS

| 2,826,215 | A | * | 3/1958 | Wolfslau | F16K 31/0689 137/454.6 |
| 5,076,538 | A | * | 12/1991 | Mohr | B60T 15/028 251/129.18 |
| 6,345,870 | B1 | * | 2/2002 | Linkner, Jr. | B60T 8/367 251/129.02 |
| 6,453,930 | B1 | * | 9/2002 | Linkner, Jr. | B60T 8/363 137/15.18 |
| 7,396,090 | B2 | * | 7/2008 | Krawczyk | B60T 8/363 251/129.02 |
| 7,575,218 | B2 | * | 8/2009 | Speer | F16K 31/0655 251/129.02 |
| 7,832,707 | B2 | * | 11/2010 | Shigeta | F16K 31/0675 251/129.02 |
| 7,871,056 | B2 | * | 1/2011 | Kratzer | B60T 8/363 251/129.02 |

(Continued)

FOREIGN PATENT DOCUMENTS

JP  2009221905  10/2009

Primary Examiner — Matthew W Jellett
(74) Attorney, Agent, or Firm — JCIPRNET (57) ABSTRACT An electromagnetic valve includes a solenoid having a bobbin, a plunger and a coil; a flow path member having a first flow path, a second flow path, a relay flow path and a valve body housing; a valve body movably disposed in the valve body housing; and a spring disposed in the valve body housing and urging the valve body, wherein the valve body further includes a plurality of guide parts which are provided at different positions along the axial direction and which are guided on an inner wall surface of the valve body housing, and a taper part which is provided between the plurality of guide parts and whose outer diameter decreases toward the one side in the axial direction.

10 Claims, 5 Drawing Sheets

(56) References Cited

U.S. PATENT DOCUMENTS 8,087,403 B2    1/2012  Asanuma et al.
8,186,370 B2 *  5/2012  Cloud ................. F16K 31/0658
                                                137/15.18

* cited by examiner

ELECTROMAGNETIC VALVE

CROSS-REFERENCE TO RELATED APPLICATIONS

The present invention claims priority under 35 U.S.C. § 119 to Japanese Application No. 2019-175745 filed on Sep. 26, 2019 the entire content of which is incorporated herein by reference.

BACKGROUND

Field of the Invention

The disclosure relates to an electromagnetic valve.

Background

An electromagnetic PCV valve mounted on a vehicle including an internal combustion engine such as an engine is known. The conventional electromagnetic PCV valve is a valve that switches between passage and blockage of blow-by gas. The conventional electromagnetic PCV valve includes a housing having a flow path through which blow-by gas may pass, a valve body in a circular columnar shape which is movably supported along the axial direction and which opens and closes the middle of the flow path, a spring in a coil shape disposed concentrically with the valve body on an outer peripheral side of the valve body and urging and moving the valve body toward one side in the axial direction, and a step motor for moving the valve body toward the other side in the axial direction against the urging force of the spring.

In the conventional electromagnetic PCV valve, since the valve body has a constant outer diameter along the axial direction in which the spring is located, the volume as a whole is relatively large and, as a result, the weight is also heavy. When the weight is heavy, it may be difficult for the valve body to move smoothly.

SUMMARY

An exemplary embodiment of an electromagnetic valve of the disclosure includes: a solenoid including a bobbin in a cylindrical shape having a through hole which penetrates along an axial direction, a plunger inserted into the through hole and supported movably along the axial direction, and a coil wound around an outer periphery of the bobbin and generating a magnetic force when energized to move the plunger; a flow path member connected to the solenoid and including a first flow path, a second flow path, a relay flow path connecting the first flow path and the second flow path, and a valve body housing disposed adjacent to the relay flow path along the axial direction; a valve body in a columnar shape disposed in the valve body housing and supported movably along the axial direction together with the plunger, wherein the valve body has a valve part which opens and closes the relay flow path on one side in the axial direction, and the valve body contacts the plunger on the other side in the axial direction; and a spring which is disposed concentrically with the valve body on an outer peripheral side of the valve body in the valve body housing and which urges the valve body along the axial direction, wherein the valve body further includes a plurality of guide parts which are provided at different positions along the axial direction on the other side in the axial direction and which are guided on an inner wall surface of the valve body housing when the valve body moves together with the plunger, and a taper part which is provided between the plurality of guide parts and whose outer diameter decreases toward the one side in the axial direction.

The above and other elements, features, steps, characteristics and advantages of the present disclosure will become more apparent from the following detailed description of the preferred embodiments with reference to the attached drawings.

DETAILED DESCRIPTION

Hereinafter, an electromagnetic valve of the disclosure will be described in detail based on exemplary embodiments of the disclosure shown in the accompanying drawings.

Hereinafter, an exemplary embodiment of an electromagnetic valve according to the disclosure will be described with reference to FIGS. 1 to 5. Further, hereinafter, for convenience of description, three axes orthogonal to each other are set as an X axis, a Y axis, and a Z axis. For example, an XY plane including the X axis and the Y axis is horizontal, and the Z axis is vertical. A direction parallel to the X axis is referred to as "the axial direction (the axis O1 direction)," and a radial direction with this axis as the center is simply referred to as "the radial direction," and a peripheral direction with the axis as the center is simply referred to as "the peripheral direction." Further, the positive side in the X axis direction may be referred to as "the one side in the axial direction" or simply as "the one side," and the negative side in the X axis direction may be referred to as "the other side in the axial direction" or simply as "the other side." In the specification, the vertical direction, the horizontal direction, the upper side and the lower side are simply names for describing the relative positional relationship of each part, and the actual dispositional relationship and the like may be a dispositional relationship and the like other than the dispositional relationship and the like indicated by these names.

Figure 1:
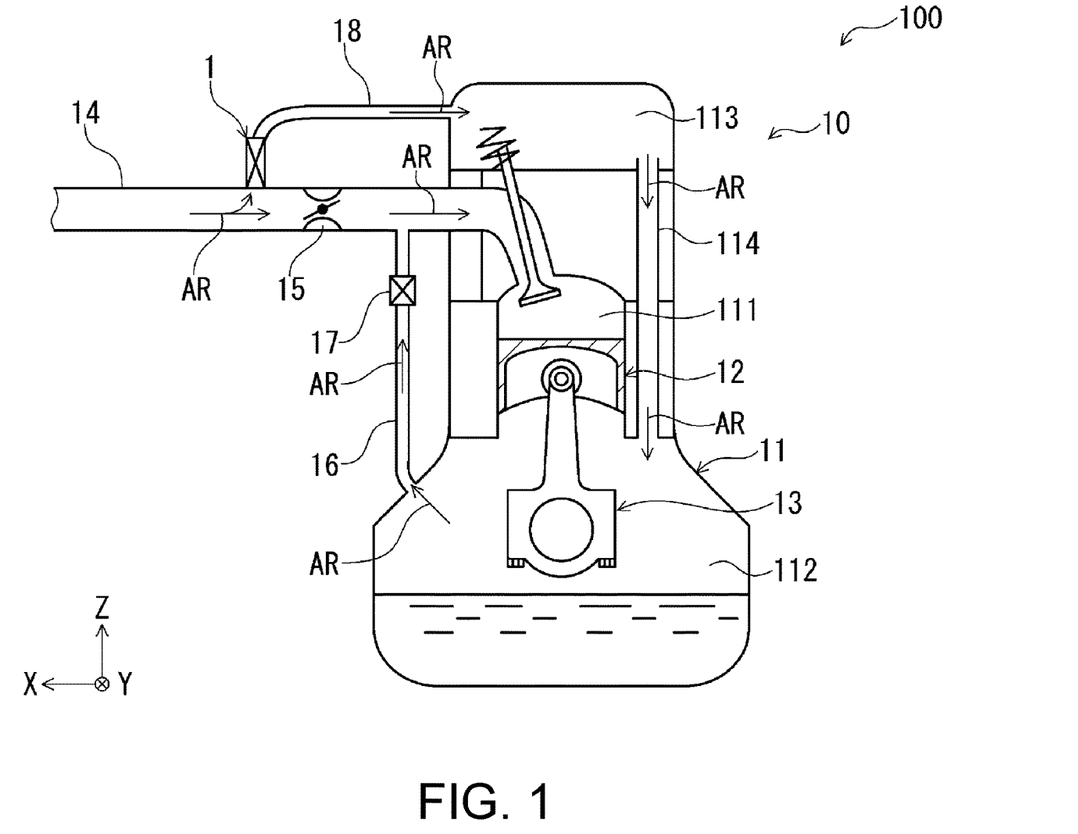
FIG. 1 is a view showing an example of a use state of an electromagnetic valve (open state) of the disclosure.
Figure 2:
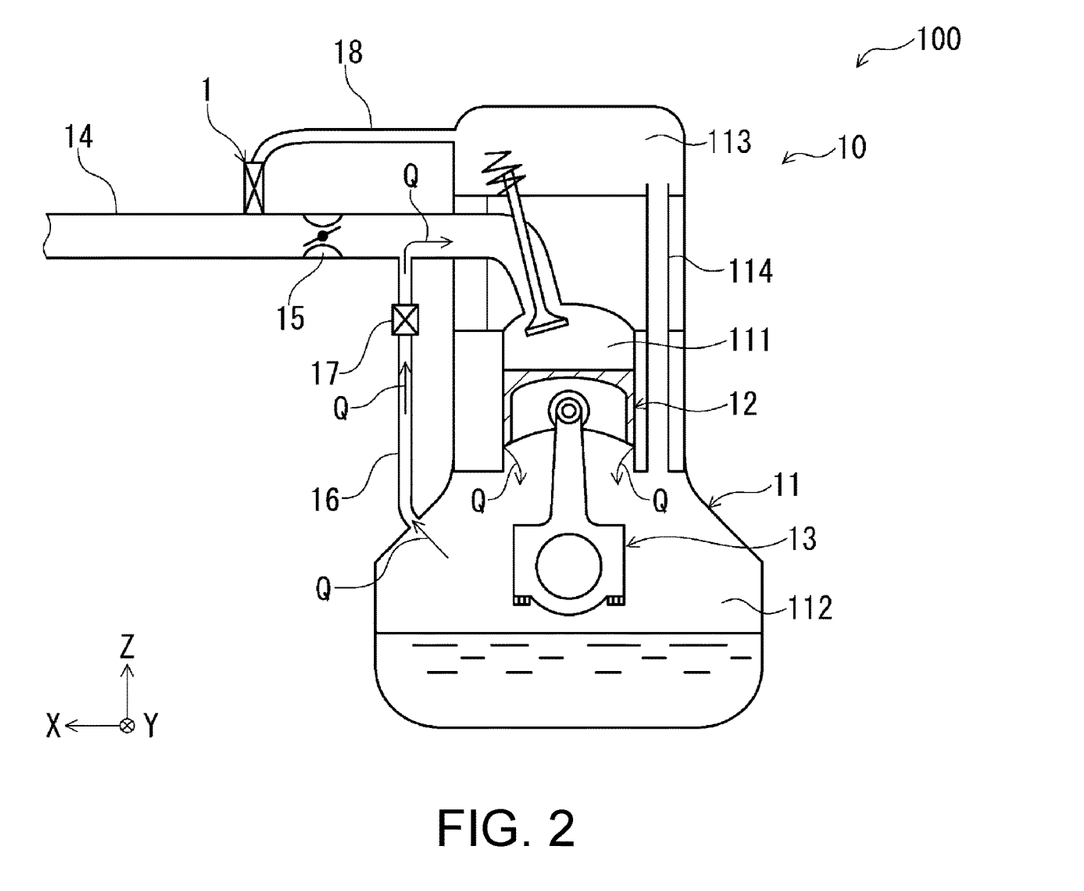
FIG. 2 is a view showing an example of a use state of an electromagnetic valve (closed state) of the disclosure.

As shown in FIGS. 1 and 2, for example, an electromagnetic valve 1 is used by being mounted on a vehicle 100 including an internal combustion engine 10 such as an engine. The internal combustion engine 10 includes a housing 11 having a combustion chamber 111, a crank chamber 112 and a buffer chamber 113; a piston 12 movably provided in the combustion chamber 111; and a crank 13 provided in the crank chamber 112 for converting the back-and-forth movement of the piston 12 into a rotation movement.

Further, in the housing 11, the crank chamber 112 and the buffer chamber 113 are connected via an internal flow path 114.

An external flow path 14 is connected to the combustion chamber 111 from the outside of the housing 11. An electromagnetic valve 15, which is a throttle valve, is disposed in the middle of the external flow path 14.

The downstream side of the electromagnetic valve 15 in the external flow path 14 and the crank chamber 112 are connected via a first auxiliary flow path 16. An electromagnetic valve 17, which is a PCV valve, is disposed in the middle of the first auxiliary flow path 16.

The upstream side of the electromagnetic valve 15 in the external flow path 14 and the buffer chamber 113 are connected via a second auxiliary flow path 18. The electromagnetic valve 1 of the disclosure is disposed in the second auxiliary flow path 18 at a boundary part with the external flow path 14. The electromagnetic valve 1 is a valve that switches between opening and closing of the external flow path 14. The electromagnetic valve 1 puts the external flow path 14 in an open state (see FIG. 1) at the time of normal traveling of the vehicle 100, and puts the external flow path 14 in a closed state (see FIG. 2) at the time of leak detection of detecting a leakage of an air-fuel mixture AR (hereinafter simply referred to as "leakage").

As shown in FIG. 1, in the open state, the air-fuel mixture AR passes through the external flow path 14, flows into the combustion chamber 111, and is used for combustion. In this way, the piston 12 may move. In addition, a part of the air-fuel mixture AR passing through the external flow path 14 flows into the second auxiliary flow path 18 from the middle of the external flow path 14, passes sequentially through the buffer chamber 113 and the internal flow path 114, and then enters the crank chamber 112. The air-fuel mixture AR that has flowed into the crank chamber 112 may return to the external flow path 14 via the first auxiliary flow path 16.

As shown in FIG. 2, in the closed state, the supply of the air-fuel mixture AR to the internal combustion engine 10 is stopped. Then, when the pressure in the combustion chamber 111 becomes high due to combustion, a portion of blow-by gas Q in the combustion chamber 111 flows over the piston 12 into the crank chamber 112. After that, the blow-by gas Q in the crank chamber 112 flows into the external flow path 14 through the first auxiliary flow path 16. At this time, if no leakage occurs, the pressure in the crank chamber 112 will decrease with time. When the pressure in the crank chamber 112 is below a threshold value, it is determined that no leakage has occurred. On the other hand, if a leakage has occurred, the pressure in the crank chamber 112 does not decrease and does not fall below the threshold value, or the pressure decrease tendency becomes slow, and it takes time to fall below the threshold value. In this case, it is determined that a leakage has occurred.

Figure 3:
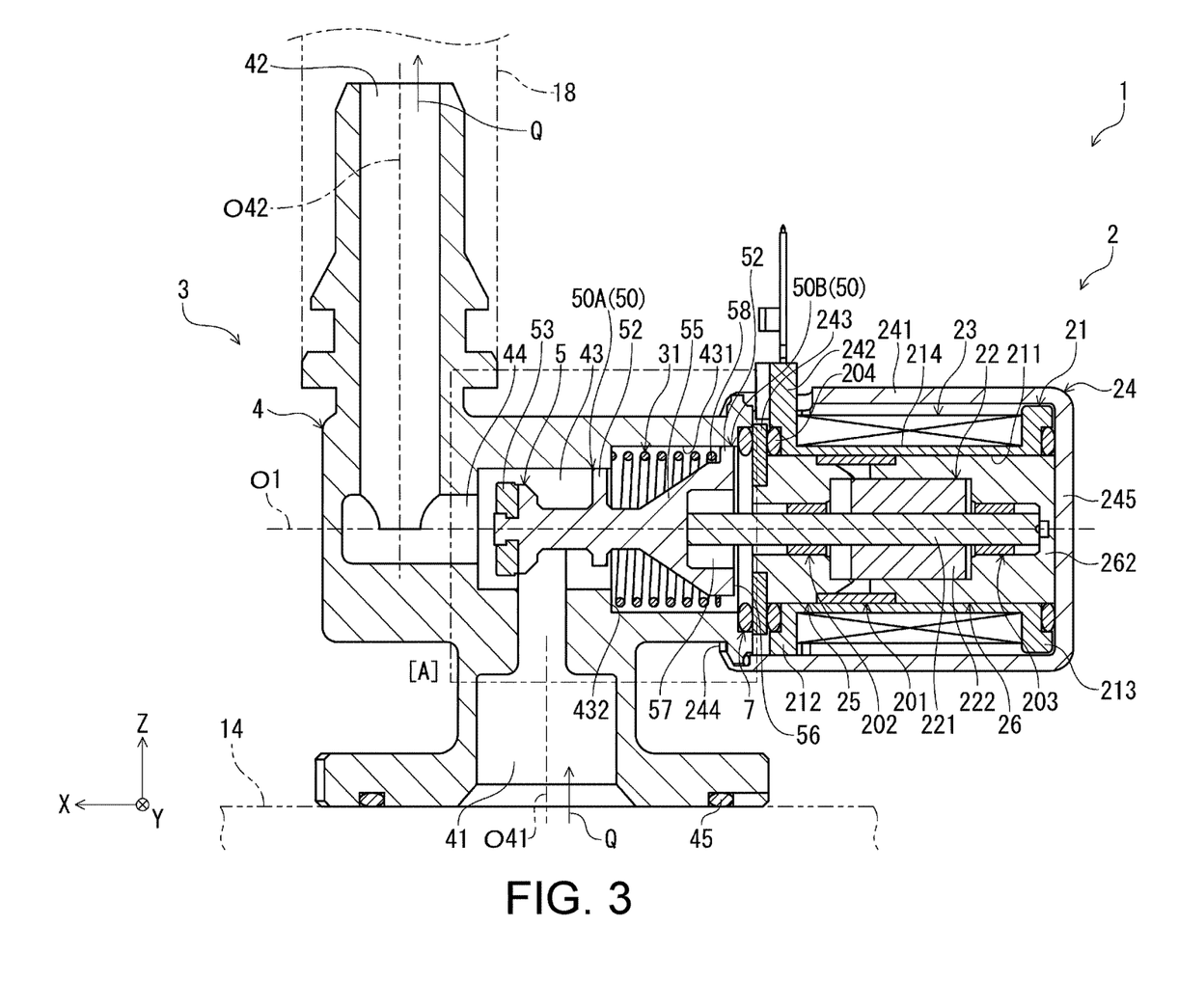
FIG. 3 is a sectional view showing an exemplary embodiment of an electromagnetic valve of the disclosure.

As shown in FIG. 3, the electromagnetic valve 1 includes a solenoid 2 disposed on the negative side in the X axis direction and a valve mechanism 3 disposed on the positive side in the X axis direction. Hereinafter, a configuration of each part will be described.

The solenoid 2 has a bobbin 21, a plunger 22, a coil 23, a case 24, a core 25, and a yoke 26.

The bobbin 21 is a member in a cylindrical or substantially cylindrical shape having a through hole 211. The through hole 211 penetrates along the axis O1 direction parallel to the X axis direction. Further, the inner diameter of the through hole 211 is constant along the axis O1 direction. The bobbin 21 has a flange 212 that protrudes in the radial direction on one side, and a flange 213 that protrudes in the radial direction on the other side. The bobbin 21 is made of, for example, various resin materials such as a polyester resin and a polyimide resin.

A coil 23 having conductivity is wound around an outer periphery 214 of the bobbin 21. When the coil 23 is energized, that is, with energization of the coil 23, a magnetic circuit is provided by the bobbin 21, the core 25, and the yoke 26, and a magnetic force may be generated. In this way, the plunger 22 may be moved along the axis O1 direction.

The core 25 and the yoke 26 are inserted into the through hole 211 of the bobbin 21, and the plunger 22 is inserted further to the inner side.

The core 25 is disposed on the one side in the axis O1 direction, and the yoke 26 is disposed on the other side in the axis O1 direction.

The core 25 has a circular cylindrical or substantially circular cylindrical shape as a whole, and is disposed parallel to the X axis direction. Further, the yoke 26 also has a circular cylindrical or substantially circular cylindrical shape as a whole, and is disposed parallel to the X axis direction. The core 25 and the yoke 26 are made of a soft magnetic material such as iron, that is, made of a soft magnetic metal material. In this way, a magnetic circuit that may sufficiently move the plunger 22 may be generated.

Further, the solenoid 2 has a connecting member 201 for connecting the core 25 and the yoke 26 in the through hole 211 while keeping the core 25 and the yoke 26 apart. The connecting member 201 has a circular cylindrical or substantially circular cylindrical shape, and the other end of the core 25 and the one end of the yoke 26 are fitted inside the connecting member 201. The connecting member 201 is made of a nonmagnetic and rust-resistant metal material such as austenitic stainless steel.

The plunger 22 is disposed to cross the core 25 and the yoke 26 and is supported to be movable alternately between the one side and the other side along the axis O1 direction, that is, to be movable back and forth.

The plunger 22 has a plunger body 222 in a circular cylindrical or substantially circular cylindrical shape and a plunger pin 221 inserted into the plunger body 222. The plunger pin 221 protrudes on both of the one side and the other side in the axis O1 direction. Further, the other side of the yoke 26 is closed by a wall part 262, and the movement limit of the plunger 22 to the other side is restricted by the plunger pin 221 coming into contact with the wall part 262, that is, colliding with the wall part 262.

Further, in the plunger 22, the plunger pin 221 is supported by a bush 202 in the core 25, and the plunger pin 221 is supported by a bush 203 in the yoke 26. In this way, the plunger 22 may move back and forth smoothly.

The case 24 houses the bobbin 21, the plunger 22, the coil 23, the core 25, and the yoke 26. The case 24 has a case body 241, a connector member 242, and a ring member 243.

The case body 241 has a circular cylindrical or substantially circular cylindrical shape with a bottom. That is, the case body 241 is a member in a cylindrical or substantially cylindrical shape having an opening 244 that opens on the one side in the axis O1 direction and a wall 245 that closes the other side. The yoke 26 contacts the wall 245 from the one side.

The ring member 243 has a circular ring or substantially circular ring shape and is disposed concentrically with the core 25 on the outer side of the core 25 in the radial direction. The ring member 243 contacts the core 25 from the one side.

Like the core 25, the case body 241 and the ring member 243 are made of a a soft magnetic metal material such as iron.

The connector member 242 is connected to a connector (not shown) that energizes the coil 23. The connector member 242 is made of, for example, a resin material, like the bobbin 21.

Further, the solenoid 2 includes in the case 24 a gasket 204 disposed between the ring member 243 and the flange 212 of the bobbin 21, and a gasket 205 disposed between the wall 245 of the case body 241 and the flange 213 of the bobbin 21.

The gasket 204 has a ring or substantially ring shape and is disposed concentrically with the core 25 on the outer peripheral side of the core 25. The gasket 204 is in a compressed state between the ring member 243 and the flange 212 of the bobbin 21, whereby the space between the ring member 243 and the flange 212 may be sealed.

The gasket 205 has a ring or substantially ring shape and is disposed concentrically with the yoke 26 on the outer side of the yoke 26 in the radial direction. The gasket 205 is in a compressed state between the wall 245 of the case body 241 and the flange 213 of the bobbin 21, whereby the space between the wall 245 and the flange 213 may be sealed.

In addition, the gaskets 204 and 205 are made of an elastic material. The elastic material is not particularly limited, and examples thereof include various rubber materials such as urethane rubber and silicone rubber.

The valve mechanism 3 includes a flow path member 4, a valve body 5, a spring 31, and a gasket 7.

The flow path member 4 is a member connected to the solenoid 2 and is configured to allow the blow-by gas Q to pass therethrough. Further, the flow path member 4 is made of, for example, a resin material, like the bobbin 21.

The flow path member 4 has therein a first flow path 41, a second flow path 42, a relay flow path 44, and a valve body housing 43.

The first flow path 41 is provided along the Z axis direction and opens toward the negative side in the Z axis direction. Further, the first flow path 41 side is connected to, for example, a pipe that defines the external flow path 14 to which the electromagnetic valve 1 is fixed, and is connected to the combustion chamber 111 via the external flow path 14. In addition, a gasket 45 is fitted for sealing the space between the flow path member 4 and the pipe that defines the external flow path 14.

The second flow path 42 is also provided along the Z axis direction and opens toward the positive side in the Z axis direction. In addition, a central axis O42 of the second flow path 42 is located on the positive side in the X axis direction with respect to a central axis O41 of the first flow path 41. Further, the second flow path 42 is connected to, for example, a pipe that defines the second auxiliary flow path 18.

The relay flow path 44 is provided along the X axis direction, that is, along the axis O1 direction and connects the first flow path 41 and the second flow path 42. For example, in the case where the internal combustion engine 10 equipped with the electromagnetic valve 1 is a naturally aspirated engine, as shown in FIG. 3, the blow-by gas Q flows from the first flow path 41 to the second flow path 42 via the relay flow path 44.

The valve body housing 43 for movably housing the valve body 5 is disposed adjacent to the relay flow path 44 on the negative side in the X axis direction. The valve body housing 43 is provided along the X axis direction (the axis O1 direction) and opens toward the negative side in the X axis direction. A sectional shape of the valve body housing 43 in a direction of the valve body housing 43 orthogonal to the X axis direction, that is, a transverse sectional shape thereof, is a circular or substantially circular shape. Further, the valve body housing 43 has a step 432 whose inner diameter decreases toward the positive side in the X axis direction (the one side in the axis O1 direction). The step 432 is located closer to the negative side in the X axis direction than the central axis O41.

Further, the gasket 7 is disposed on the negative side in the X axis direction of the valve body housing 43. The gasket 7 has a ring or substantially ring shape and is provided concentrically with the valve body housing 43. The gasket 7 is in a compressed state between the flow path member 4 and the ring member 243, whereby the space between the flow path member 4 and the ring member 243 may be sealed. In addition, the gasket 7, like the gasket 204, is made of an elastic material such as urethane rubber.

Figure 4:
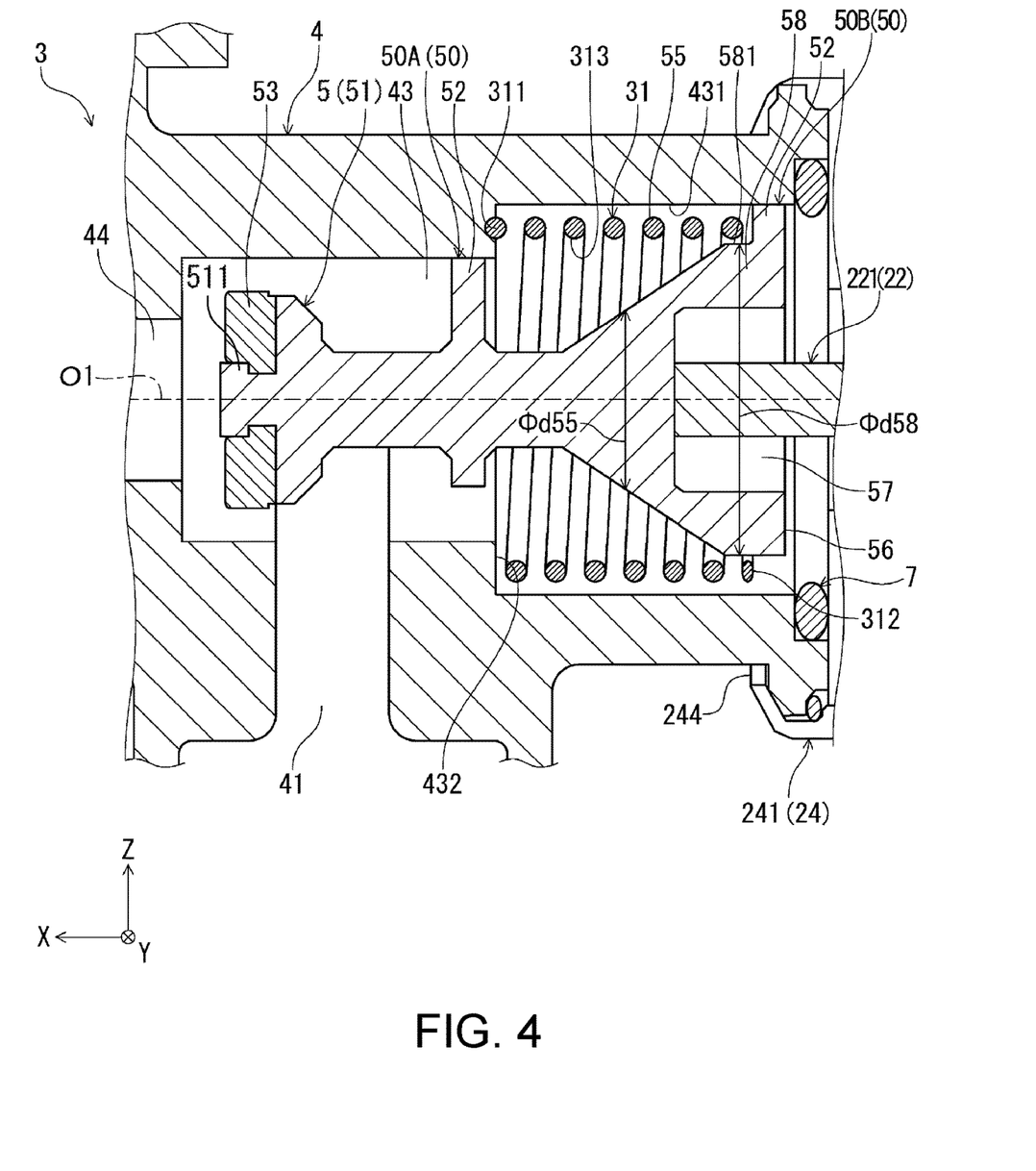
FIG. 4 is an enlarged view of the region [A] circled by a one-dot chain line in FIG. 3.

As shown in FIGS. 3 and 4, in the valve body housing 43, the valve body 5 is disposed in contact with the plunger 22 on the negative side in the X axis direction (the other side in the axis O1 direction) and movable together with the plunger 22 along the axis O1 direction. The valve body 5 has a body 51 in a columnar or substantially columnar shape and a valve part 53 in a ring or substantially ring shape. The body 51 is disposed parallel to the X axis direction. The body 51 is provided with a protrusion 511 that protrudes toward the positive side in the X axis direction and is inserted into the valve part 53 in a ring or substantially ring shape. In this way, the protrusion 511 is fitted into the valve part 53, whereby the valve part 53 may be fixed to the body 51.

The valve part 53 may open and close the relay flow path 44 on the positive side in the X axis direction (the one side in the axis O1 direction) when the valve body 5 moves along the axis O1 direction. FIGS. 3 and 4 show a state where the valve part 53 is separated from the relay flow path 44, and the relay flow path 44 is in the open state. In the open state, the blow-by gas Q may pass through. Further, when the valve part 53 is in contact with the relay flow path 44, the relay flow path 44 is in the closed state. In the closed state, the blow-by gas Q is blocked.

Further, the body 51 may be made of a metal material such as aluminum. In addition, the valve part 53, like the gasket 204, is made of an elastic material such as urethane rubber.

The body 51 has two guide parts 50 provided apart from each other along the X axis direction (that is, provided at different positions), and a taper part 55 provided between the two guide parts 50. Further, although in this exemplary embodiment, two guide parts 50 are provided, the number of guide parts 50 disposed is not limited to two, and may be three, for example.

Each guide part 50 is disposed closer to the negative side in the X axis direction (the other side in the axis O1 direction) than the valve part 53, and is guided on an inner wall surface 431 of the valve body housing 43 when the valve body 5 moves together with the plunger 22. In this way, the valve body 5 may move stably.

Further, one guide part 50A of the two guide parts 50 is disposed in the middle (center part) in the longitudinal direction of the body 51, and the other guide part 50B is disposed closest to the base end side of the body 51. The guide part 50A is located closer to the positive side in the X axis direction (the one side in the axis O1 direction) than the step 432, and the guide part 50B is located closer to the negative side in the X axis direction (the other side in the axis O1 direction) than the step 432. In this way, the two guide parts 50 may be disposed as far apart as possible, whereby the valve body 5 may move stably and smoothly.

Figure 5:
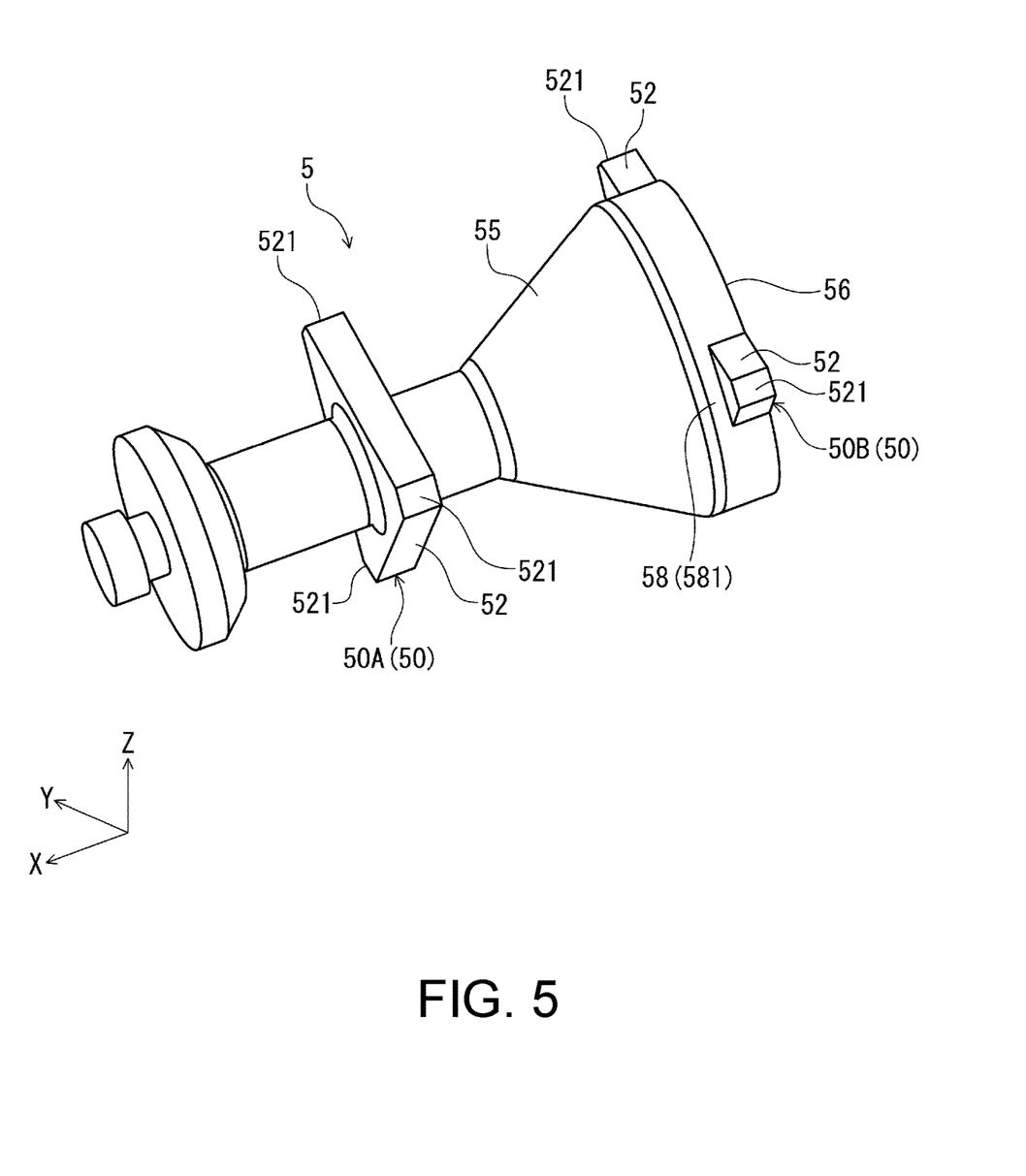
FIG. 5 is a perspective view of the valve body included in the electromagnetic valve shown in FIG. 3.

As shown in FIG. 5, each of the guide parts 50 has a protrusion 52 provided to protrude from the outer periphery of the valve body 5 toward the outer side in the radial direction. Further, the protrusion 52 of the guide part 50A is a rectangular plate-shaped or substantially rectangular plate-shaped part, and each top 521 slides on the inner wall surface 431 of the valve body housing 43 when the valve body 5 moves. Three protrusions 52 of the guide part 50B are provided at equal intervals along the peripheral direction of the body 51, and like the guide part 50A, the tops 521 of the respective protrusions 52 slide on the inner wall surface 431 of the valve body housing 43. In this way, the sliding resistance of the valve body 5 with the inner wall surface 431 may be suppressed as much as possible. As a result, the valve body 5 may slide stably; that is, the sliding property of the valve body 5 is improved. Further, even if the blow-by gas Q contains impurities, since the area of the tops 521 is small, the impurities may be suppressed or prevented from adhering to the tops 521. In this way, it is possible to prevent the movement of the valve body 5 from being hindered by impurities, and thus the sliding property of the valve body 5 is further improved. Further, the transverse sectional shape of the inner wall surface 431 is a circular or substantially circular shape. Each top 521 has an arc or substantially arc shape with the same curvature as the circular or substantially circular shape of the inner wall surface 431. In this way, the valve body 5 may slide smoothly.

Further, the number of the protrusions 52 of the guide part 50B disposed is not limited to three, and may be two or four or more, for example. Further, the guide part 50A may have a configuration having a plurality of protrusions 52, like the guide part 50B.

The taper part 55 is disposed between the guide part 50A and the guide part 50B. The taper part 55 is a part whose outer diameter φd55 gradually decreases toward the positive side in the X axis direction (the one side in the axis O1 direction).

Further, the valve body 5 has a constant outer diameter part 58 which is provided between the taper part 55 and the guide part 50B of the two guide parts 50 that is located on the negative side in the X axis direction, and whose outer diameter φd58 is constant along the axis O1 direction. The outer diameter φd58 of the constant outer diameter part 58 is the same as the maximum outer diameter φd55 of the taper part 55.

For example, in a case where the taper part 55 is omitted and the constant outer diameter part 58 is provided till the portion of the taper part 55, the valve body 5 has a relatively large volume as a whole and, as a result, the weight is also heavy. It may be difficult for the valve body 5 having a heavy weight to move smoothly.

In the electromagnetic valve 1, the valve body 5 has the taper part 55. In this way, the weight of the valve body 5 may be reduced and the valve body 5 may move smoothly compared with the case where the taper part 55 is omitted.

As shown in FIGS. 3 and 4, the valve body 5 has a recess 57 provided in a surface 56 on the negative side in the X axis direction (the other side in the axis O1 direction). The recess 57 is a part that is recessed toward the positive side in the X axis direction, and the depth thereof reaches a portion where the taper part 55 is located, that is, the middle of the taper part 55. In this way, the weight of the valve body 5 may be further reduced by the amount of the recess 57, which contributes to the smooth movement of the valve body 5.

Further, the positive side in the X axis direction of the plunger pin 221 (plunger 22) is inserted into the recess 57. In this way, since the plunger pin 221 is inserted into the recess 57, the size of the electromagnetic valve 1 in the axis O1 direction may be reduced. As described above, the depth of the recess 57 reaches the middle of the taper part 55. In this way, the plunger pin 221 may be inserted into the recess 57 as deeply as possible, which contributes to reducing the size of the electromagnetic valve 1.

The spring 31 is disposed in the valve body housing 43 together with the valve body 5. The spring 31 is a coil spring which urges the valve body 5 along the axis O1 direction, and is disposed concentrically with the valve body 5 on the outer peripheral side of the valve body 5. Further, the spring 31 has one end 311 in contact with the step 432 on the positive side in the X axis direction (the one side in the axis O1 direction) and has the other end 312 in contact with the guide part 50B on the negative side in the X axis direction (the other side in the axis O1 direction). In this way, the spring 31 is in a compressed state between the step 432 and the guide part 50B, whereby the valve body 5 may be urged to the negative side in the X axis direction. Then, the urging force of the spring 31 may move the valve body 5 together with the plunger 22 to the negative side in the X axis direction. In this way, the valve body 5 may be separated from the relay flow path 44 to put the relay flow path 44 in the open state.

In addition, to put the relay flow path 44 in the closed state, the solenoid 2 moves the plunger 22 together with the valve body 5 to positive side in the X axis direction against the urging force of the spring 31.

Further, the spring 31 is a coil spring, and particularly preferably a compression coil spring. In this way, the structure of the spring 31 is simplified.

Further, an outer periphery 581 of the constant outer diameter part 58 of the valve body 5 is in contact with an inner periphery 313 of the spring 31, which is a coil spring. In this way, the spring 31 is prevented from buckling in the valve body housing 43, whereby the spring 31 may expand and contract stably.

Although the electromagnetic valve of the disclosure has been described above with the exemplary embodiments of the drawings, the disclosure is not limited thereto. Each part which configures the electromagnetic valve may be replaced with any configuration which may exhibit the same function. Moreover, any component may be added.

Further, although the electromagnetic valve 1 is used by being mounted on the vehicle 100 including the internal combustion engine 10 such as an engine in the above exemplary embodiments, the applicable place of the electromagnetic valve is not limited to the vehicle 100. Further, the fluid whose passage and blockage are switched by the electromagnetic valve 1 is not limited to gas (blow-by gas Q) but may be a liquid or a mixture of gas and liquid.

Further, in the above exemplary embodiments, the electromagnetic valve 1 is configured so that the blow-by gas Q flows from the first flow path 41 toward the second flow path 42, but the blow-by gas Q may flow from the second flow path 42 toward the first flow path 41 depending on the use state of the electromagnetic valve 1.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electromagnetic valve, comprising:
    a solenoid comprising:
        a bobbin in a cylindrical shape having a through hole which penetrates along an axial direction;

a plunger pin inserted into the through hole and supported movably along the axial direction; and
a coil wound around an outer periphery of the bobbin and generating a magnetic force when energized to move the plunger pin;
a flow path member connected to the solenoid and comprising:
a first flow path;
a second flow path;
a relay flow path connecting the first flow path and the second flow path; and
a valve body housing disposed adjacent to the relay flow path along the axial direction;
a valve body in a columnar shape disposed in the valve body housing and supported movably along the axial direction together with the plunger pin, wherein the valve body has a valve part which opens and closes the relay flow path on one side in the axial direction, and the valve body contacts the plunger pin on other side in the axial direction; and
a spring which is disposed concentrically with the valve body on an outer peripheral side of the valve body in the valve body housing and which urges the valve body along the axial direction,
wherein the valve body further comprises:
a plurality of guide parts which are provided at different positions along the axial direction on the other side in the axial direction and which are guided on an inner wall surface of the valve body housing when the valve body moves together with the plunger pin;
a taper part which is provided between the plurality of guide parts and whose outer diameter decreases toward the one side in the axial direction; and
a recess which is provided on a surface on the other side in the axial direction and which is recessed toward the one side in the axial direction,
wherein one side of the plunger pin in the axial direction is inserted into the recess and contacts a bottom surface of the recess, and
the recess is recessed to a portion where the taper part is located.

2. The electromagnetic valve according to claim 1, wherein the valve body housing has a step whose inner diameter decreases toward the one side in the axial direction, and
the spring contacts the step on the one side in the axial direction and contacts, on the other side in the axial direction, a guide part of the plurality of guide parts that is located on the other side in the axial direction.

3. The electromagnetic valve according to claim 1, wherein in the plurality of guide parts, one guide part is located closer to the one side in the axial direction than the step, and another guide part is located closer to the other side in the axial direction than the step.

4. The electromagnetic valve according to claim 1, wherein each of the plurality of guide parts has a plurality of protrusions provided to protrude from an outer periphery of the valve body toward an outer side in a radial direction.

5. The electromagnetic valve according to claim 2, wherein each of the plurality of guide parts has a plurality of protrusions provided to protrude from an outer periphery of the valve body toward an outer side in a radial direction.

6. The electromagnetic valve according to claim 3, wherein each of the plurality of guide parts has a plurality of protrusions provided to protrude from an outer periphery of the valve body toward an outer side in a radial direction.

7. The electromagnetic valve according to claim 1, wherein the spring is a coil spring,
the valve body has a constant outer diameter part which is provided between the taper part and a guide part of the plurality of guide parts that is located on the other side in the axial direction and whose outer diameter is constant along the axial direction, and
an outer periphery of the constant outer diameter part contacts an inner periphery of the coil spring.

8. The electromagnetic valve according to claim 2, wherein the spring is a coil spring,
the valve body has a constant outer diameter part which is provided between the taper part and a guide part of the plurality of guide parts that is located on the other side in the axial direction and whose outer diameter is constant along the axial direction, and
an outer periphery of the constant outer diameter part contacts an inner periphery of the coil spring.

9. The electromagnetic valve according to claim 3, wherein the spring is a coil spring,
the valve body has a constant outer diameter part which is provided between the taper part and a guide part of the plurality of guide parts that is located on the other side in the axial direction and whose outer diameter is constant along the axial direction, and
an outer periphery of the constant outer diameter part contacts an inner periphery of the coil spring.

10. The electromagnetic valve according to claim 4, wherein the spring is a coil spring,
the valve body has a constant outer diameter part which is provided between the taper part and a guide part of the plurality of guide parts that is located on the other side in the axial direction and whose outer diameter is constant along the axial direction, and
an outer periphery of the constant outer diameter part contacts an inner periphery of the coil spring.

* * * * *